Figures 1, 2, 3, 4:
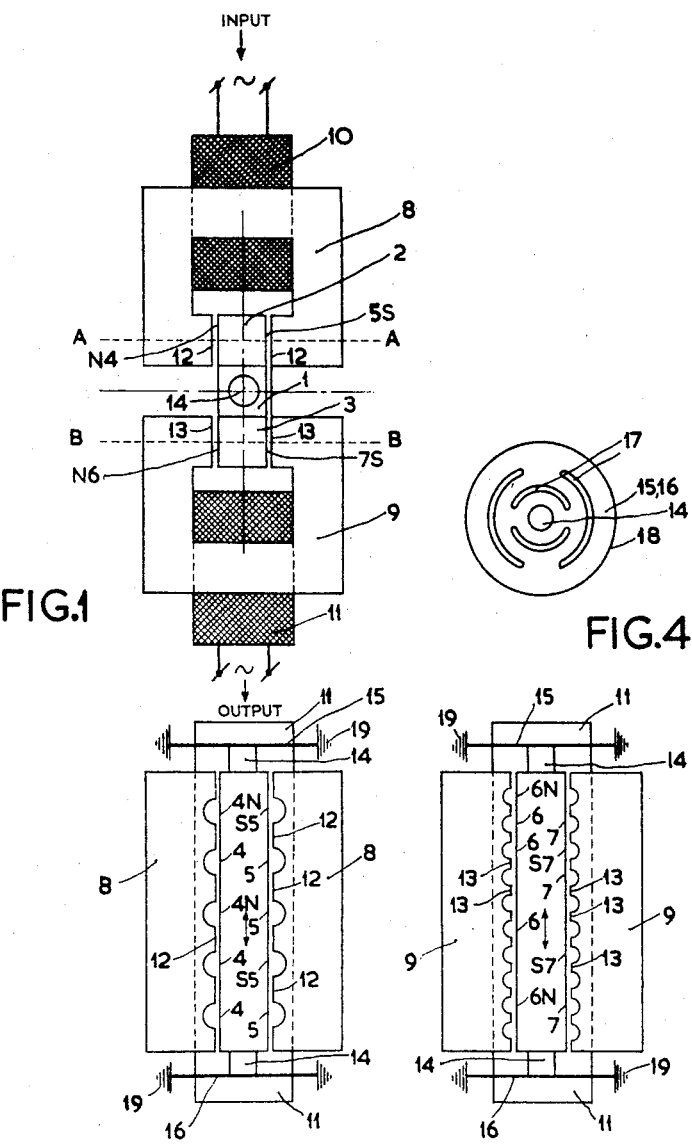

March 17, 1959 P. E. F. KASSNER ET AL 2,878,439
FREQUENCY CONVERTER
Filed Oct. 18, 1956

INVENTOR
PAUL EMIL FRITZ KASSNER
FLORUS CORNELIS WILLEM SLOOFF
BY
AGENT

United States Patent Office 2,878,439
Patented Mar. 17, 1959

2,878,439
FREQUENCY CONVERTER

Paul Emil Fritz Kassner and Florus Cornelis Willem Slooff, Emmasingel, Eindhoven, Netherlands, assignors, by mesne assignments, to North American Philips Company, Inc., New York, N. Y., a corporation of Delaware Application October 18, 1956, Serial No. 616,781

Claims priority, application Netherlands November 15, 1955

6 Claims. (Cl. 321—63)

This invention relates to frequency converters.

The inventive frequency converter comprises a body having at least two rows of permanent magnetic poles, which rows have different numbers of poles. Each row cooperates with a magnetic circuit having a corresponding number of poles, with each magnetic circuit comprising a winding. The body on the one hand and the magnetic circuits on the other are arranged to be relatively movable in a reciprocating manner by means of suitable resilient means.

Such a frequency converter may fundamentally be of a very simple construction and has no rotary parts.

In order that the invention may be readily carried into effect, one embodiment will now be described, by way of example with reference to the accompanying drawing, in which:

Fig. 1 is a cross-sectional view and Figs. 2 and 3 are plan views of sections taken along the lines A—A and B—B, while Fig. 4 shows a member providing resilient suspension.

In Fig. 1, a supporting body 1 of nonferromagnetic material (so as not to short-circuit the magnetic poles) comprises two permanent magnetic rods 2 and 3. The magnets may consist of an alloy of Fe, Co, Ni and Al or the like or of any other suitable material such as ceramic magnets. As may be seen from Figures 2 and 3, each rod has a row of permanent magnetic poles 4, 5 and 6, 7, respectively, opposite polarities, so that for example, the poles 4 and 6 constitute N-poles and the poles 5 and 7 constitute S-poles. The numbers of poles of the two rods are different. The rods 2 and 3 co-operate with magnetic circuits 8 and 9, respectively, for instance of soft iron, comprising windings 10 and 11, respectively.

The magnetic circuit 8 has corporal poles 12, preferably corresponding to the number of poles 4 and 5 and the circuit 9 has corporal poles 13, preferably corresponding to the number of poles 6 and 7.

The body 1 together with the permanent magnets 2 and 3 comprises a shaft 14, which at opposite ends is secured to a pair of members 15 and 16 providing resilient suspension means for the body 1. These members may consist, for example, of resilient diaphragms provided with slots 17 (see Fig. 4) and have their edges 18 secured to fixed supports 19. With this arrangement, the body 1 can reciprocate between the members 15 and 16 (move vertically in Figs. 2 and 3).

In the rest position of the body 1, the poles 4, 5 are preferably opposite the recesses which exist between the corporal poles 12, so that the converter will start easily when the winding 10 is energized.

When the winding 10 is connected, for example, to an alternating-current source of line frequency, the body 1 is driven in a reciprocating movement in the direction of the double arrow and set into oscillation between the two suspensions 15 and 16, preferably in the natural frequency of the entire combination of the body and supports. As a result thereof, the permanent magnet 3 together with the poles 6 and 7 is also driven and since the numbers of poles of the magnet 3 and of the magnetic circuit 9 are different from the numbers of poles of the magnet 2 and of the magnetic circuit 8, an alternating voltage having a frequency other than the line frequency may be derived from the winding 11, depending on the number of the corporal poles 13 and the magnet poles 6 and 7. The number of the corporal poles 12 and the magnet poles 4 and 5 depend on the desired output power from the output winding 11.

If the number of the poles 13 and 6 and 7 is two times as large as the number of the poles 12 and 4 and 5, the frequency derived from the winding 11 will be twice the input line frequency.

What is claimed is:

1. A device adapted for frequency conversion, comprising a body having a plurality of permanent magnet portions, each of said permanent magnet portions having a plurality of magnetic poles in a particular array with the poles of like polarity in the said array adjacent one another, plural magnetic circuits each including a winding and each magnetically coupled to one of said permanent magnet portions, at least two of said permanent magnet portions possessing a different array of poles, and means supporting said body and magnetic circuits and enabling relative reciprocal movement therebetween.

2. A device as claimed in claim 1, wherein means are provided for energizing a winding of one magnetic circuit, and means are provided for deriving electrical energy from a winding of another magnetic circuit.

3. A device adapted for frequency conversion, comprising a body having plural permanent magnet portions, said permanent magnet portions having a plurality of magnetic poles arrayed in substantially parallel rows with the poles of like polarity in the same row, plural magnetic circuits each including a winding and plural pole portions, each of said circuits being magnetically coupled to one of said permanent magnet portions in such manner that their respective pole portions are adjacent one another, said permanent magnet portions possessing different numbers of poles but each possessing the same number of poles as the adjacent magnetic circuit, and means supporting said body and magnetic circuits and enabling relative reciprocal movement therebetween.

4. A device as set forth in claim 3, wherein a pair of resilient members support opposite ends of the body and enable the said body to reciprocate relative to the magnetic circuits.

5. A device adapted for frequency conversion comprising an elongated body having opposed permanent magnet portions extending along the length of the body, each of said permanent magnet portions having a plurality of magnetic poles arrayed along its length with the poles of like polarity on the same side in the said array, plural magnetic circuits each including a winding and plural pole portions mounted adjacent each of said permanent magnet portions so that their pole portions extend adjacent to and in the same direction as the poles of the permanent magnet portions, said permanent magnet portions having different numbers of poles but the same number of poles as the adjacent magnetic circuits, and resilient means supporting said body for reciprocal movement in its longitudinal direction.

6. A device as claimed in claim 5, wherein signal input means are coupled to one of said windings for reciprocating the body, and signal output means are coupled to another of the windings for deriving an output signal therefrom at a frequency different from said input signal frequency.

References Cited in the file of this patent

UNITED STATES PATENTS

| | | |
|---|---|---|
| 1,544,010 | Jordan | June 30, 1925 |
| 1,997,193 | Kato et al. | Apr. 9, 1935 |
| 2,722,617 | Cluwen et al. | Nov. 1, 1955 |